March 13, 1934.     W. JOHNSON     1,951,053
MAIL BOX
Filed June 22, 1932     2 Sheets-Sheet 2
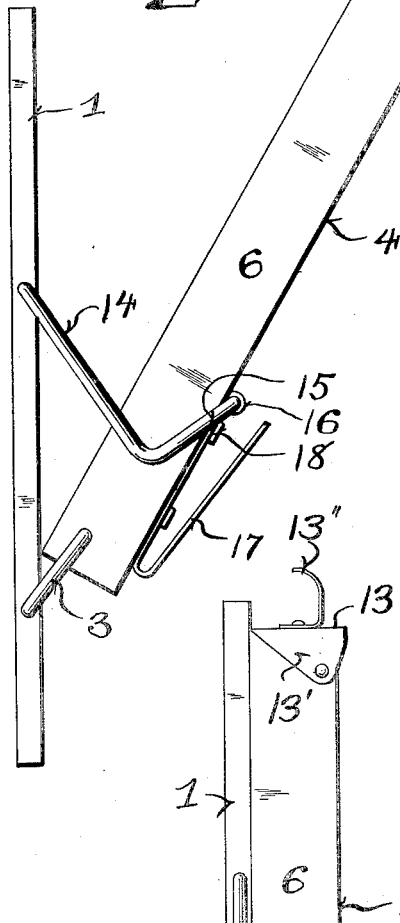
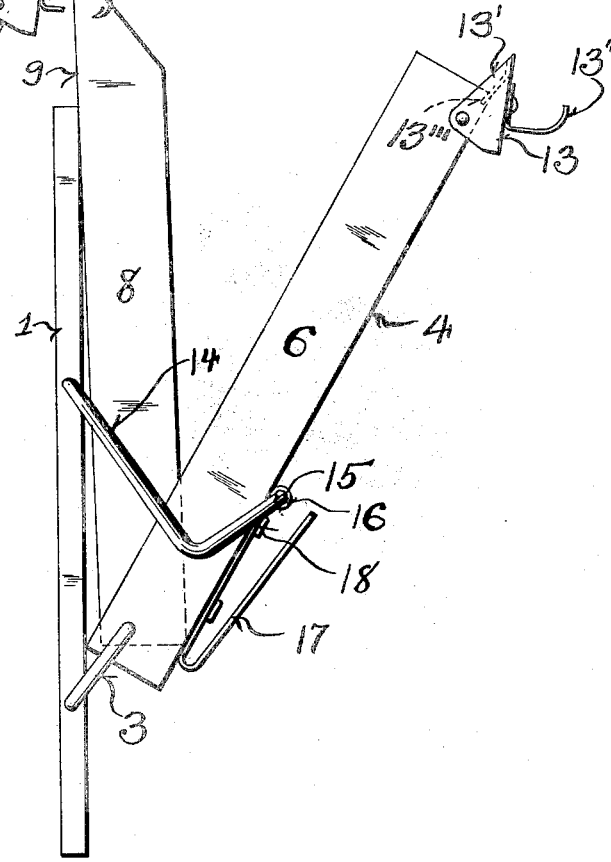
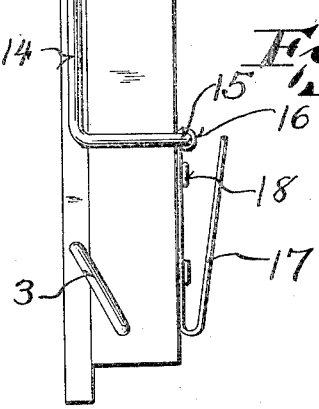

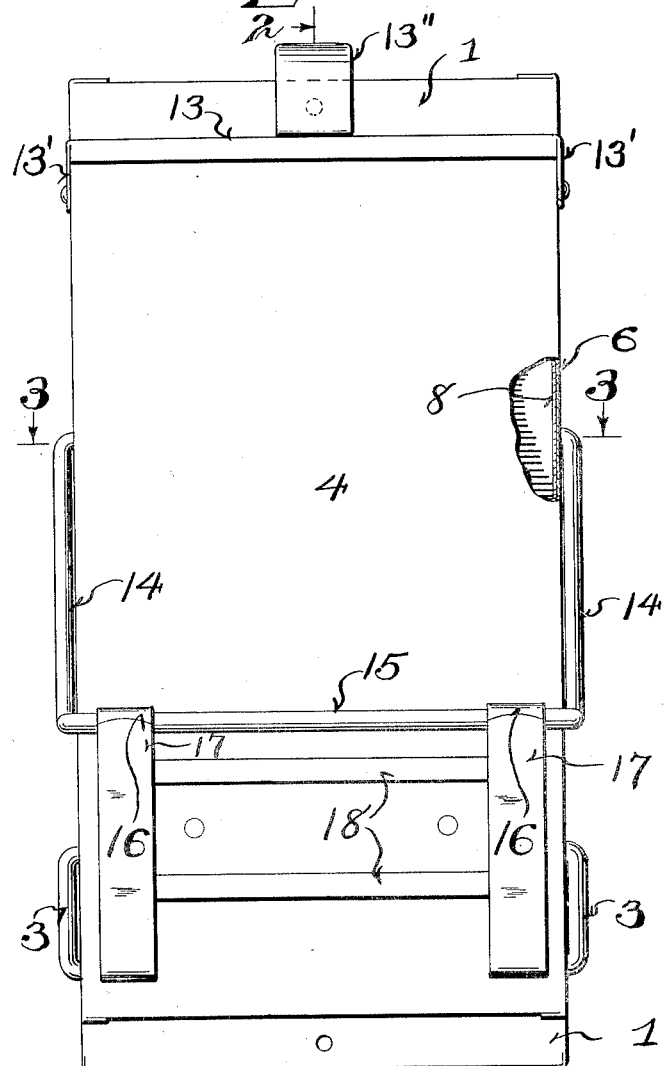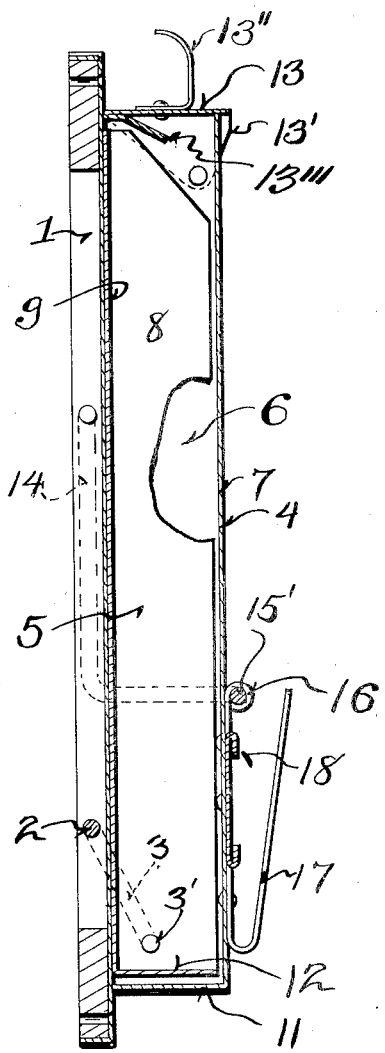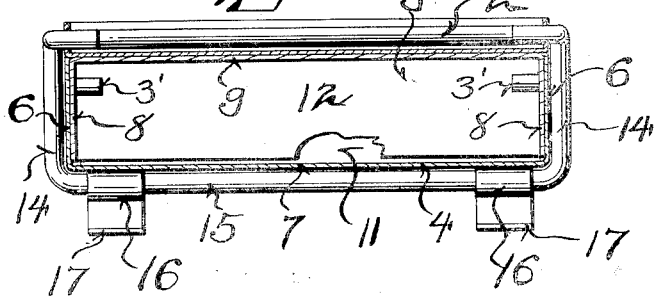

Patented Mar. 13, 1934

1,951,053

UNITED STATES PATENT OFFICE 1,951,053

MAIL-BOX

Walfred Johnson, Racine, Wis., assignor of one-half to Walter P. Ritter, Racine, Wis.

Application June 22, 1932, Serial No. 618,586

1 Claim. (Cl. 232—17)

My invention refers to mail-boxes or receptacles particularly adapted for household use, and it has for its object to provide a simple, economical and effective mail-box which can be quickly opened or closed by one hand manual operation.

A specific object of my invention is to provide a two-section box, which is practically weather-proof, the same being swung upon links or pivots from a frame, whereby the two sections which are pivoted together, can be readily swung open for access to the mail, and which sections will be held in this open position until slightly tipped, whereby they will automatically close. In other words, these sections operate like jaws that are spread apart and are held in such spread or open position by gravity, and when given a slight closing movement, the jaws will automatically close.

With the above and other minor objects in view, the invention consists of certain peculiarities of construction and combination of parts, as will be set forth with reference to the accompanying drawings and subsequently claimed.

In the drawings, Figure 1 represents a front elevation of a mail-box embodying the features of my invention;

Figure 2 is a longitudinal sectional view through the same, the section indicated by the line 2—2 of Figure 1;

Figure 3 is a cross section of the box, the section being indicated by the line 3—3 of Figure 1.

Figure 4 is a side elevation of the box, showing the same swung to a partially open position;

Figure 5 is a similar view showing the box-sections or jaws in full open position; and, Figure 6 is a similar view illustrating the box in its closed position.

Referring by characters to the drawings, 1 represents a base plate, having pivoted therein at its lower end, a bar 2, which bar extends beyond the frame and terminates in a pair of short links 3—3. The free ends of these links are hingedly connected to the box sections, the outer of which constitutes a cover-section 4 and the inner a body-section 5. The cover-section is provided with side walls 6—6 and a front wall 7. The body-section is provided with similar side walls 8—8 and a rear wall 9, it being understood that these box sections also have lower end walls 11 and 12, respectively, as shown in Figure 2.

When the box sections are in their closed position, as best shown in Figures 2 and 3, the side walls 6 and 8 thereof are in telescopic union, that is, they snugly engage each other throughout their length, it being understood that the upper or mouth end of these box sections are open, whereby access is readily had to the contents of the mail-box.

As best shown in Figures 2 and 6 of the drawings, when the box is in its closed position, a lid 13 is folded over the open mouth portion thereof, the said lid being provided with downturned ears 13' which are pivotally connected to the side walls of the box proper, while the inturned longitudinal lip 13''' facilitates insertion of mail into the box as the same projects over the upper edge of the box section 4 (Fig. 5).

The arms 14 of a bail 15 are pivotally connected to the frame 1 at a predetermined distance above the short pivot links 3, and the cross bar 15' of said bail is hingedly secured to the bottom 7 of the cover-section 4 by strap members 16, which are secured to the said box wall. These strap members terminate in open-jawed clips 17, which are conveniently arranged for the reception of large pieces of mail and papers, or the like. The strap members have also connected thereto a channeled frame 18, which is provided for the reception of a card, or the like, whereby the name and other data of the owner of the box may be inserted.

Furthermore, it will be noted that, owing to the position of the clips, card-receiving channel pieces, and the like, there is a large area of the box bottom 7 of the cover section 4 which is unobstructed and which will be utilized, in practice, for impressing therein advertisements, or the like.

Attention is particularly directed to the fact that the lower links 3 have inturned ends 3', which ends pass through both the side walls 8 of the body section and the front cover box section walls 6. Thus, these pintles form hinge elements for independent movement of the cover and box, and when the box is in its closed position, as indicated in Figure 6, gravity will cause the box to be held in snug engagement with the frame, due to the position of the pivots in conjunction with the bail 14, which constitutes a long link.

When it is desired to have access to the box, the operator grasps the finger loop 13'' of the lid 13, and in pulling the same forward, the initial movement will result in the opening of the mouth of the box, and thereafter the box sections will swing to the position illustrated in Figure 4. The operator then inserts his hand into the open mouth of the box and in so doing, the cover section will be thrown rearward on its low pivot point to the position indicated in Figure 5.

It is understood that when the box is swung to its open position, that the links 3 will swing upwardly in an arc of a circle from the position shown in Figure 6 to that shown in Figure 4, and the long link element 14 will also swing outwardly to serve as a support for the box, in its open or inclined position, and in this position, the lower corner of the box will engage and rest upon the supporting plate 1.

In other words, the short and long links function to permit free movement of both the box and cover sections.

In operation the box is opened by manipulation of the cover handle 13''. Initial movement will cause the cover 13 to be opened, and further movement will then raise the box on the links until its inner lower edge engages the base plate, as shown in Figure 4, in which position the box is supported by gravity. To open the box the inner body section 5 can then be tilted rearwardly on the link 3 until the upper portion engages the base plate in an inclined position, as shown in Figure 5, thus permitting letters to be readily inserted or removed from the box.

In some instances it may be necessary to provide for mail of miscellaneous shape, such as round, square and so on, which cannot be placed in the box, or in the clips 17. Mail of this character is taken care of by placing the same upon the links 14 between the box and base plate when the parts are in open position, as disclosed in Figure 4. The entire box can then be tilted rearwardly, and gravity will cause the same to assume normal position, with the miscellaneous mail held between the box and base plate.

Here attention is directed to the angular construction of the long links 14. Were these links straight, mail placed between the box and base plate, particularly envelopes or folders too large to be positioned in the box, might become wedged or squeezed between the links and the box. However, the present shape of offset link permits the upper portion to normally hang parallel with the base plate, as shown in Figure 1, while an envelope or folder is supported transversely upon the lower offset arms.

From the foregoing explanation, taken in connection with the accompanying drawings, it will be readily seen that an exceedingly simple, inexpensive and rigid mail-box has been provided, which will readily accommodate itself to mail of any description, and materially facilitates either insertion or removal of mail, in that the same can be readily manipulated by means of one hand, with a simple operation, gravity returning the box to closed or normal position. Loading of the box is further facilitated by the lip 13''', which not only reinforces the cover, but also projects over the top edge of the outer section, thus preventing the same from obstructing mail placed into the box.

While I have shown and described a preferred embodiment of my invention, it will be readily apparent from the foregoing that slight changes in construction may be made when putting the invention into practice, without departing from the spirit or scope of the appended claim.

I claim:

A mail box comprising an attaching face plate, a pair of companion box-sections, a relatively short link pivotally connected to the face plate and to the sections adjacent to their lower ends for pivotally connecting said sections together and to the face plate, and a relatively long link of angle shape in side elevation, including relatively long arms and relatively short arms, means pivotally connecting the long arms of the last mentioned link to the face plate, means pivotally connecting the relatively short arms to the front face of the outermost box-section, said links forming means whereby the box-sections can be swung as a unit away from said face plate, the short arms of the long link being connected with the outermost box-section, below its transverse center, whereby an unobstructed space will be provided between the box-sections and the face plate when said box-sections are swung away from the face plate.

WALFRED JOHNSON.